United States Patent [19]

Roberts, Jr. et al.

[11] 4,223,895

[45] Sep. 23, 1980

[54] GASKET FOR MULTIPLE GROOVE PIPE AND METHOD OF USING SAME

[75] Inventors: James E. Roberts, Jr., Canton; James E. Voelker, Bay Village, both of Ohio

[73] Assignee: Robintech, Inc., Ft. Worth, Tex.

[21] Appl. No.: 931,388

[22] Filed: Aug. 7, 1978

Related U.S. Application Data

[63] Continuation of Ser. No. 656,135, Feb. 9, 1976, abandoned, which is a continuation of Ser. No. 533,260, Dec. 16, 1974, abandoned.

[51] Int. Cl.² ............................................. F16J 9/00
[52] U.S. Cl. ............................... 277/169; 277/215; 277/DIG. 2
[58] Field of Search ................. 277/169, 168, DIG. 2, 277/205, 209, 215

[56] References Cited

U.S. PATENT DOCUMENTS

| | | | |
|---|---|---|---|
| 2,245,154 | 6/1941 | McWane | 277/169 |
| 3,173,694 | 3/1965 | Nathan . | |
| 3,573,371 | 4/1971 | Warner | 277/168 |

*Primary Examiner*—Robert I. Smith
*Attorney, Agent, or Firm*—Roylance, Abrams, Berdo & Farley

[57] ABSTRACT

A resilient gasket adapter to form a tight seal between pipes, said gasket having a plurality of projections which interact with cooperating pipe structure to retain the gasket in position as pipes are joined. This gasket overcomes the problem of fishmouthing, a situation in which a gasket is pushed out of a retaining groove as pipes are joined.

16 Claims, 4 Drawing Figures

GASKET FOR MULTIPLE GROOVE PIPE AND METHOD OF USING SAME

This application is a continuation of application Ser. No. 656,135, filed Feb. 9, 1976, which is a continuation of application Ser. No. 533,260, filed Dec. 16, 1974, now abandoned.

BACKGROUND OF THE INVENTION

1. Field of the Invention

This invention relates to the joining of pipes wherein a sealing gasket is used to make the pipes fluid (gas or liquid) tight.

2. Description of the Prior Art

The use of a gasket in a groove is well known in joining pipe. However, the effectiveness of any gasket largely depends upon the interaction of the gasket with respect to the two interconnected pipes. "Interconnected" is herein used to mean the arrangement wherein a portion of one pipe is contained within a portion of a second pipe, respectively an inner and outer pipe. The solution to the problem of maintaining the gasket in a fixed position between two interconnected pipes has been approached by having a groove either in the internal wall of the outer pipe or the outer wall of the inner pipe. The geometry of this groove has been varied in attempts to overcome the problem from the tendency of the relative movement of the pipe walls inner or outer pipe to displace the gasket out of said groove. The term used to describe this displacement problem is "fishmouthing".

One proposal of the prior art was to provide a rectangular groove having steep sides. This was alleged to overcome the problem of fishmouthing much better than a curved or bell-shaped groove. However, rectangular grooves create a problem because in forming the vertical walls and sharp-angled corners of said grooves there is a thinning of the pipe wall and new stresses are locked in the grooves, thus weakening the pipe and making it susceptible to damage.

Another proposal was to use a gasket whose durometer (hardness) is not homogenous having a harder portion alleged to hold the gasket in position in one pipe and a softer portion positioned to form the seal with a second pipe. One such gasket was designed to be positioned in a generally trapezoidal groove.

In summary, the solutions proposed by the prior art involve either the geometry of a single groove or the physical properties of the gasket; as for example, differential hardness.

BRIEF SUMMARY OF THE INVENTION

In its broadest aspect, our invention comprises a resilient gasket having a forward edge, a rearward edge, a first side, and a second side, adapted for use in sealing the connection between pipe lengths wherein a spigot on one end of a pipe extends into a bell on an adjacent pipe and wherein there are a plurality of projections extending from said first side of said gasket adapted to mate with said grooves, a flat second side radially spaced from said first side, said flat second side extending longitudinally of said gasket for the total length thereof except for the portion thereof opposite the rearward projection and spaced radially from the wall of the pipe not containing grooves, and, radially opposite said rearward portion, an arm adapted to be contacted and compressed by the surface of the pipe opposite said grooves to form a fluid tight seal between pipe lengths.

Preferably, the projections extending from said first side are arcuate. Generally, two projections extending from said first side are sufficient although more can be used where greater resistance to movement of the gasket are required. Materials for the production of gaskets such as this are well known, these comprising natural or synthetic rubbery or plastic materials. In one embodiment, a two-component gasket is used with the rearward portion being softer than the rest of the gasket. As an optional feature, the friction between the gasket and the corresponding groove in the pipe can be increased by scoring the first side of the gasket.

Another aspect of our invention resides in the method for joining two pipes and seating a gasket to form a seal there between wherein there are used:

(a) a gasket having opposite first and second sides; the first of said sides is shaped so as to mate with a plurality of grooves formed in a first pipe, each pair of said grooves being separated by a bridge; the second of said sides has two ends; a forward end of said gasket is so shaped that, as a second interconnectable pipe slides coaxially to said first interconnectable pipe, the second pipe does not significantly touch said forward end of said gasket; the rearward end has a projection or arm extending radially away from said gasket and away from said grooves at an angle so as to be contacted by the leading edge of said second interconnecting pipe, then forced into a direction paralled to each pipe's axis and compressed between a surface of said second interconnecting pipe and that surface of the first pipe which is in contact with said first side of said gasket to form a fluid tight seal between said pipes;

(b) two pipes, one of which being provided with a plurality of grooves;

(c) the total mass of the material in the forward end of said gasket so selected that it will not be sufficiently deformable as to pass between the surface of a bridge of the first pipe and any opposing surface of the second interconnecting pipe opposite thereto. As is well known in the art, the gasket carrying grooves can be located in either the bell or spigot end of the pipe.

PREFERRED EMBODIMENT

Figure 1:
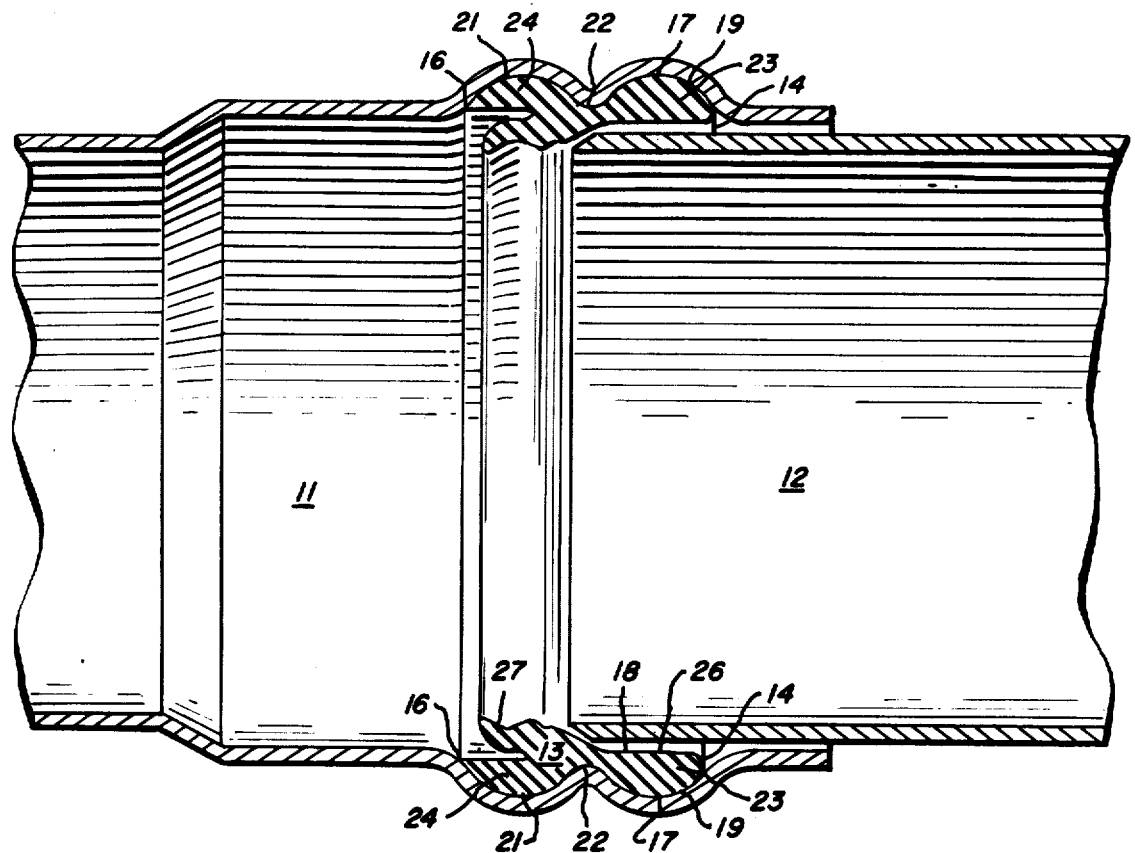
FIG. 1 shows partly in section, two pipes at an intermediate step in said the process of being joined.

Directing attention to FIG. 1, pipes 11 and 12 are shown partly in section. This Figure illustrates the gasket of this invention in relation to these pipes as they are being pushed together. The gasket 13, shown in section and in FIG. 2, comprises a forward end 14, a rearward end 16, a first side 17 and a second side 18. The bell end of pipe 11 contains two grooves 19 and 21 with a bridge 22 therebetween. The first side 17, of gasket 13, has two projections 23 and 24 so designed to mate with grooves 19 and 21 in the bell of pipe 11.

The exact shape of the grooves in the bell and the projections on a gasket can be considerably varied, although arcuate grooves are preferred in order to retain the best pipe strength. These could vary considerably from the shape shown and, where there is sufficient pipe strength, could be V-shaped, rectangular, or trapezoidal.

The second side 18 of the gasket has a portion thereof in the forward end 14 which is flat and spaced radially from said first side. This flat side 26 is so designed as to have clearance between the outer surface of pipe 12 and said flat surface of the gasket. On the rearward end 16 of gasket 13, we provide a rearwardly extending projection or arm 27 of such size that it is contacted and compressed by the surface of pipe 12 as the movement of pipe 12 continues into the fully inserted position. This rearwardly extending projection is spaced radially from projection 24.

Figure 2:
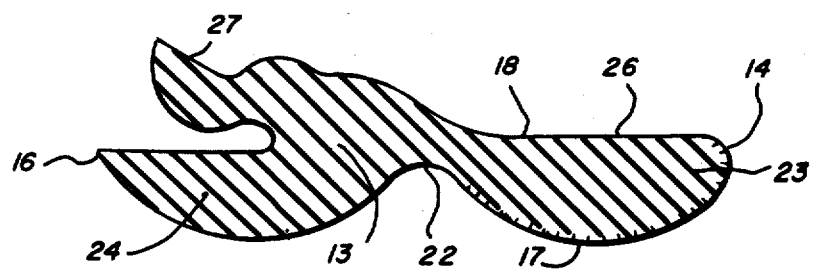
FIG. 2 is an enlarged cross-section of the gasket of our invention.

FIG. 2 clearly illustrates a preferred modification in which the outer surface of projection 23 is scored substantially along its entire length. This increases the friction between the gasket and a corresponding groove in the pipe.

While it should be obvious to those skilled in the art how the gasket operates in joining pipes, a brief description of how this is understood to occur is given but we do not wish to be limited to this exact method of operation. In assembling pipes, the gasket 13 is placed in position in the pipe grooves. This can be done in the field or at the point of manufacture. Pipes 11 and 12 are then pushed together. Initially, as illustrated in FIG. 1, pipe 12 does not contact the gasket until it reaches substantially the position shown in FIG. 1. We designate this point as the "minimum contact point". This point is defined as that point on the second side 18 of gasket 13 opposite the bridge 22 between the grooves 19 and 21 in the bell. the radial distance between pipes 11 and 12 at this minimum contact point is such that the mass of the material in the forward end 14 of the gasket will not, even if deformed, pass through this space. This mass of the gasket material holds the complete gasket 13 substantially in position as the pipes are moved together and the desired seal obtained between projection or arm 27 in the surface of the pipe. Thus, fishmouthing does not occur and the gasket cannot be moved out of an effective position.

Figure 3:
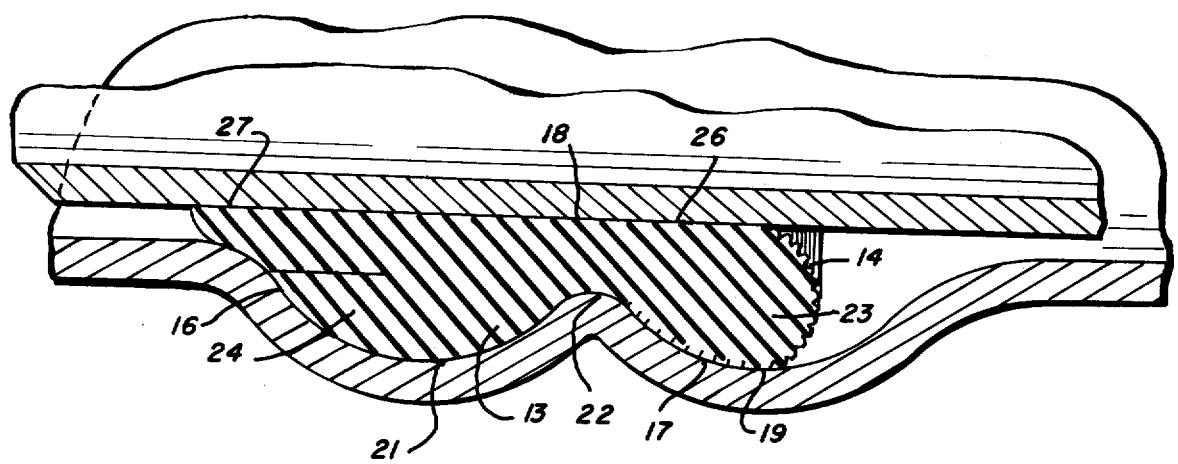
FIG. 3 is a cross-section view shows the assumed deformation of the gasket as the right end pipe of FIG. 1 continues movement toward the left end.

We have, in FIG. 3, attempted to illustrate the position of the gasket showing how the forward end is retained more or less in position as the pipes are being connected.

Figure 4:
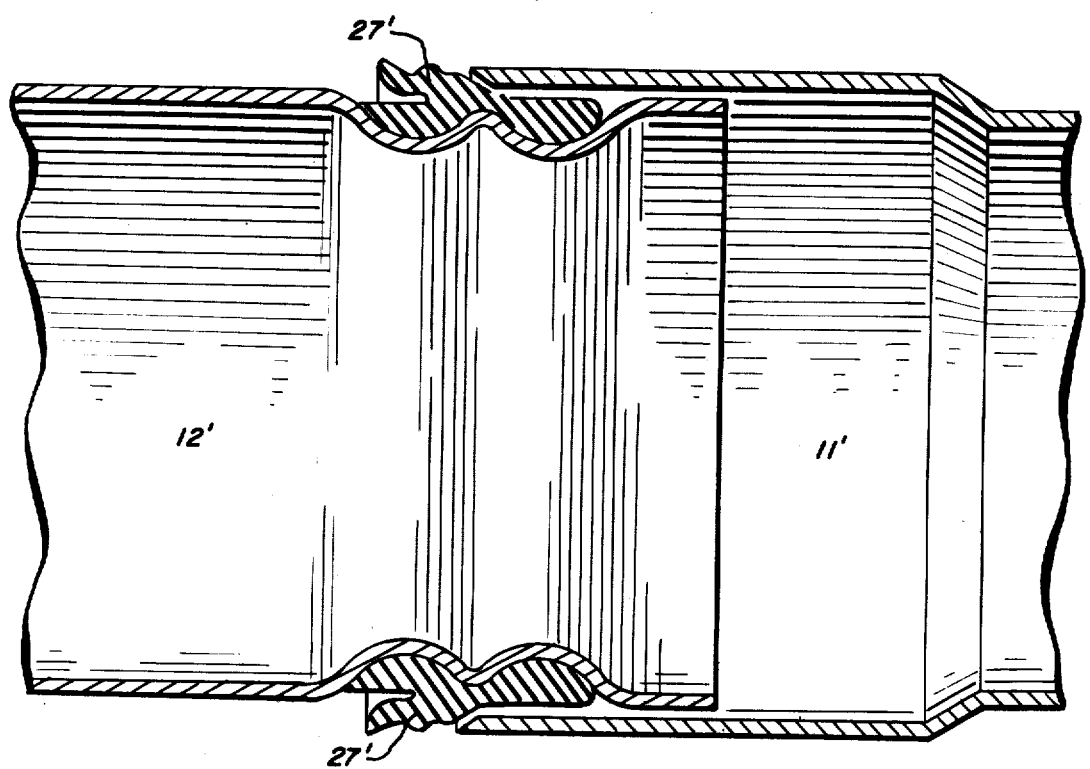
FIG. 4 shows, partly in section, a joint in which the gasket retaining grooves and gasket are located on the spigot end of the pipe.

FIG. 4 illustrates a modification of the invention in which the grooves are formed in the spigot end of the pipe which is inserted into the usual bell. The gasket is mechanically similar to that shown in FIGS. 1 and 2 but the end portions are reversed so that the arm 27' is on the opposite end of the gasket. The assembly of the pipes shown in FIG. 4 takes place in the same manner as that previously described.

Materials of construction of such gaskets are well known. Suitable examples of rubbery or elastomeric material include natural rubber, SBR rubber, polybutadiene rubber, polyisoprene rubber, polyetrafluroethylene, various plastic compounds, etc.

The gasket of our invention can be used with substantially any size pipe. It is particularly useful with PVC sewer pipe and water distribution pipe having a nominal size of 4 to 16 inches. It is also useful with fiberglass polyester reinforced plastic mortar pressure pipe which is made in diameters of 8 inches to several feet.

For conciseness, in the preceding specification, we have referred to connecting "pipes" but of course our invention will be used in connecting pipe and fittings used therewith. In some applications "pipe" is referred to as "tubing". In the communications industry single or multichannel, round or rectangular members are used which are referred to as "conduit". In heating and ventilating systems the term "duct" is used. Our gasket is capable of use in all of these applications.

Finally, while we have described a specific embodiment of our invention, it will be apparent to those skilled in the art that various modifications can be made without departing from the broad scope thereof.

We claim:

1. A resilient, generally ring-like gasket for forming a seal between two interconnected pipes comprising
    opposed forward and rearward axial ends;
    oppositely facing first and second lateral sides;
    a forward circumferential projection on said first lateral side adjacent said forward end;
    a rearward circumferential projection on said first lateral side adjacent said rearward end and axially spaced from said forward projection;
    a bridge portion between said forward and rearward projections;
    a substantially cylindrical surface extending axially on said second lateral side adjacent said forward end and laterally opposite said forward projection, said cylindrical surface and said forward projection being substantially coextensive in an axial direction; and
    a deformable projection on said second lateral side adjacent said rearward end, laterally opposite said rearward projection, and axially spaced from said cylindrical surface, said deformable projection extending radially away from said rearward circumferential projection to a greater extent than said cylindrical surface is spaced from said forward circumferential projection.

2. A resilient gasket according to claim 1, wherein said cylindrical surface and said forward projection are substantially coextensive in an axial direction.

3. A resilient gasket according to claim 1, wherein the axial cross-sectional shape of said forward and rearward projections is curved.

4. A resilient gasket according to claim 1, wherein said rearward projection is softer than the remainder of said gasket.

5. A resilient gasket according to claim 1, wherein said forward projection of the gasket, but not said rearward projection, is scored to increase friction.

6. A resilient gasket according to claim 1, wherein said first lateral side is the internal face of the gasket and said second lateral side is the external face of the gasket.

7. A resilient gasket according to claim 1, wherein said first lateral side is the external face of the gasket and said second lateral side is the internal face of the gasket.

8. A resilient gasket according to claim 1, wherein said deformable portion comprises an arm extending radially away from said rearward projection and rearwardly at an angle;
    whereby said arm may be contacted by the leading edge of the other pipe, then forced in a direction parallel thereto and compressed between the pipes for form a fluid tight seal therebetween.

9. A pipe joint comprising a first pipe with a bell formed at one end thereof;

a second pipe with a spigot formed at one end thereof having a uniform external diameter to mate with the internal surface of said bell;

a forward groove and a rearward groove formed in one of said bell and said spigot;

a pipe bridge portion between said grooves; and a generally ring-like gasket for forming a seal between said bell and spigot comprising opposed forward and rearward axial ends;

oppositely facing first and second lateral sides;

a forward circumferential projection on said first lateral side adjacent said forward end and mounted in said forward groove;

a rearward circumferential projection on said first lateral side adjacent said rearward end and axially spaced from said forward projection and mounted in said rearward groove;

a gasket bridge portion between said forward and rearward projections mounted on said pipe bridge portion;

a substantially cylindrical surface extending axially on said second lateral side adjacent said forward end and laterally opposite said forward projection, said cylindrical surface facing the other of said bell and spigot;

a deformable portion on said second lateral side adjacent said rearward end, laterally opposite said rearward projection, and axially spaced from said cylindrical surface;

the diameter of said cylindrical surface being so related to the diameter of said other of said bell and spigot that a clearance fit is provided between said cylindrical surface and said other of said bell and spigot when said spigot is inserted at least partially in said bell;

the diameter of said deformable projection being so related to the diameter of said other of said bell and spigot that a substantial interference fit is provided between said deformable projection and said other of said bell and spigot;

whereby, when the pipes to be interconnected are moved coaxially relative to each other to interconnect same, a leading edge of the other of said bell and spigot may pass along said first lateral side adjacent said cylindrical surface without substantially deforming said gasket until the leading edge has passed by said forward projection and contacts said deformable projection so that the gasket is locked in place by the first projection prior to substantial deformation of the gasket.

10. A pipe joint according to claim 9, wherein said cylindrical surface and said forward projection are substantially coextensive in an axial direction.

11. A pipe joint according to claim 9, wherein the axial cross-sectional shape of said forward and rearward projections and said grooves is curved.

12. A pipe joint according to claim 9, wherein said rearward projection is softer than the remainder of said gasket.

13. A pipe joint according to claim 9, wherein said forward projection of the gasket, but not said rearward projection, is scored to increase friction.

14. A pipe joint according to claim 9, wherein said gasket is mounted in said bell.

15. A pipe joint according to claim 9, wherein said gasket is mounted in said spigot.

16. A pipe joint according to claim 9, wherein said deformable projection comprises an arm extending radially away from said rearward projection and rearwardly at an angle;

whereby said arm may be contacted by a leading edge of the other of said bell and spigot, then forced in a direction parallel thereto and compressed between said bell and said spigot to form a fluid tight seal therebetween.

* * * * *